United States Patent
Jain et al.

(10) Patent No.: US 12,469,191 B2
(45) Date of Patent: Nov. 11, 2025

(54) CURVE OFFSET OPERATIONS

(71) Applicant: Adobe Inc., San Jose, CA (US)

(72) Inventors: Arushi Jain, Ashok Vihar (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 132 days.

(21) Appl. No.: 17/984,967

(22) Filed: Nov. 10, 2022

(65) Prior Publication Data
US 2024/0161358 A1   May 16, 2024

(51) Int. Cl.
G06T 11/20   (2006.01)

(52) U.S. Cl.
CPC ........ G06T 11/203 (2013.01); *G06T 2200/24* (2013.01)

(58) Field of Classification Search
CPC ............... G06T 11/203; G06T 2200/24
See application file for complete search history.

(56) References Cited

U.S. PATENT DOCUMENTS

| | | | | |
|---|---|---|---|---|
| 7,259,761 B2* | 8/2007 | Shih | .......... | G06F 3/038 715/702 |
| 8,576,222 B2* | 11/2013 | Handley | ............... | G06F 3/0346 345/419 |
| 10,289,656 B2 | 5/2019 | Ranjan | | |
| 2003/0051615 A1* | 3/2003 | Denoue | ..................... | B41J 3/36 101/485 |
| 2005/0137806 A1* | 6/2005 | Kutsyy | ............. | G06F 18/24143 424/9.1 |
| 2007/0293962 A1* | 12/2007 | Kimura | .............. | G05B 19/4103 700/182 |
| 2008/0144942 A1* | 6/2008 | Besley | ................. | G06V 30/413 382/209 |
| 2009/0245654 A1* | 10/2009 | Xing | ..................... | G06F 40/183 382/203 |
| 2011/0069890 A1* | 3/2011 | Besley | ................... | G06V 30/40 382/199 |
| 2012/0314924 A1* | 12/2012 | Carlton | .................. | A61B 34/25 382/128 |
| 2016/0351170 A1* | 12/2016 | Asente | .................. | G06T 11/203 |
| 2017/0024910 A1* | 1/2017 | Griffin | .................... | G06T 11/00 |

(Continued)

OTHER PUBLICATIONS

Li et al—Automatic design for trimming die insert of automotive panel—2020—Springer (Year: 2020).*

(Continued)

*Primary Examiner* — YuJang Tswei
(74) *Attorney, Agent, or Firm* — FIG. 1 Patents (57) ABSTRACT

Curve offset operations as implemented by a digital image editing system are described. Input points are received via a user interface and a determination is made that a first set of the input points satisfy a condition for use as part of a curve offset operation with respect to a curve. A first segment is added to a path using the curve offset operation. The first segment is generated by aligning the first set of input points using an offset value based on the curve. A determination is then made that a second set of the input points do not satisfy the condition for use as part of the curve offset operation and a second segment is added to the first segment of the path. The second segment is generated using the second set of points and the path is displayed.

20 Claims, 8 Drawing Sheets

(56) References Cited

U.S. PATENT DOCUMENTS

2017/0039722 A1* 2/2017 Sheffer .................. G06T 17/30
2017/0309045 A1* 10/2017 Asente ................ G06F 3/04883
2022/0047868 A1* 2/2022 Odland ................ A61N 1/0502
2022/0122261 A1* 4/2022 Ezhov ....................... G06T 7/11

OTHER PUBLICATIONS

Haines, Eric, "Graphics Gems Repository", Real Time Rendering [retrieved 2022-11-03]. Retrieved from the Internet <https://www.realtimerendering.com/resources/GraphicsGems/>., Sep. 10, 2021, 2 Pages.

Jaines, Eric, "GraphicsGems", GitHub, Inc. Uploaded by erich666 [retrieved 2022-11-03]. Retrieved from the Internet <https://github.com/erich666/GraphicsGems/blob/master/gems/Roots3And4.c>., 2013, 6 Pages.

* cited by examiner

| Algorithm 1 |
|---|
| ING |
| 1: procedure |
| 2:    *Tolerance* ← Snapping Tolerance |
| 3:    *InputPoint* ← Pen placement point of cursor |
| 4:    if current placement positon and last placement position of pen , both are on offset trajectory, then this is a case of valid Auto completion mode then |
| 5:       *StartPlacementPos* ← last pen position on offset path. this is the StartPlacement Position of the partial trajectory to be completed |
| 6:       *EndPlacementPos* ← current placement positon . this is the EndPlacement Position of the partial trajectory to be completed |
| 7:       for every segment *Segment* from *StartPlacementPos* to *EndPlacementPos* in sequential order do |
| 8:          Add segments into snapped Path |
| 9:    if either last pen position OR current pen position lies on outside environment of offset path then |
| 10:       Then this is case of flexible deviation from offset path. |
| 11:       In this case, we simply append only the new placed pen position into the snapped path. |

CURVE OFFSET OPERATIONS

BACKGROUND

Digital images are configurable to include a multitude of different objects having a variety of configurations. Examples of these configurations include vector objects, raster objects, and so forth. Further, each of these configurations includes shapes having varying degrees of complexity, e.g., from simple shapes such as circles, rectangles and so on to complex shapes used to represent a flame, leaf, and so forth. Consequently, digital image editing systems are confronted with a variety of challenges to address this complexity to aid configuration of the multitude of objects within the digital images.

SUMMARY

Curve offset operations as implemented by a digital image editing system are described. The curve offset operations are configured to align input points based on a curve in a digital image at an offset from that curve. These techniques are also flexible by supporting deviations from this operation as desired, e.g., to generate a path having a segment offset as following a curve and another segment that is not based on the curve or the offset. The path, for instance, is configurable to both follow and depart from following a curve of another object in the digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Conventional techniques implemented by digital image editing systems support a wide variety of functionality to configure shapes of objects having a wide range of complexity. A content creator, for instance, is able to select objects having relatively simple shapes from a menu, e.g., squares, circles, triangles, and so forth. The digital image editing system also supports complex shapes that are drawn in a use interface as freeform lines, such as to depict a leaf, a flame, scales on a fish, and so forth. This variety and complex of shapes used by objects in a digital image, however, provides challenges in object arrangement, creation of additional objects that complement another complex shape, mimic that shape, and so forth. This complexity leads to visual artifacts and inaccuracies in conventional digital image editing systems, e.g., due to an inability of manually recreate a complex shape of an object in a user interface.

To address these challenges, curve offset operations as implemented by a digital image editing system are described. The curve offset operations are configured to align input points based on a curve (e.g., a Bezier curve) in a digital image at an offset from that curve. These techniques are also flexible by supporting deviations from this operation as desired, e.g., to generate a path having a segment offset as following a curve and another segment that is not based on the curve or the offset. The path, for instance, is configurable to both follow and depart from following a curve of another object in the digital image. Replica techniques are also supported in which the offset value is set to zero and therefore is used to directly recreate portions of a curve. As a result, these techniques improve digital image editing system accuracy and reduce visual artifacts that are included in digital images and objects generated using these operations.

In one example, input points are received by a digital image editing system via a user interface, e.g., using a cursor control device, a gesture, and so forth. The input, for instance, is provided as specifying a beginning input point and an end input point, e.g., as two "taps" detected as a gesture, a drawn line, and so forth.

In response, a determination is then made by the digital image editing system as to whether the input points satisfy a condition for use as part of a curve offset operation. This includes determining whether one or more of the input points are within a threshold trajectory from a curve included in the user interface, e.g., that is used to define an object. The threshold trajectory, for instance, is defined based on an offset value, e.g., the offset value plus a defined additional amount. The offset value is definable in a variety of ways, such as based on a user input, detected from distances between objects in a digital image, and so forth.

In a scenario in which the inputs satisfy the condition, the curve offset operation is utilized to generate a segment by completing a trajectory between the input points, e.g., between the beginning input point and the end input point. The segment is configured to follow the curve at the offset value. As a result, the segment is configurable to follow simple and complex curves automatically and without user intervention.

These techniques also support flexible operation. Continuing the example above, a second set of the input points is then received, which follows a first set of the input points described above to generate the segment. A determination is made in this example that the second set does not satisfy the condition for use as part of a curve offset operation. The second set of the input points, for instance, includes a beginning input point disposed within the threshold trajectory, however an end input point is disposed beyond the threshold trajectory. As a result, the digital image editing system generates another segment which is not aligned to the curve. This segment is then added to the previous segment forming a path in the user interface. This permitted deviation from the curve by the system supports complex artworks that are not possible in conventional systems.

As a result, the techniques described herein overcome challenges in object arrangement, creation of additional objects that complement another complex shape, mimic that shape, and so forth. Further, these techniques reduce and even eliminate visual artifacts and inaccuracies in conventional digital image editing systems, e.g., due to an inability of manually recreate a complex shape of an object in a user interface. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

Figure 1:
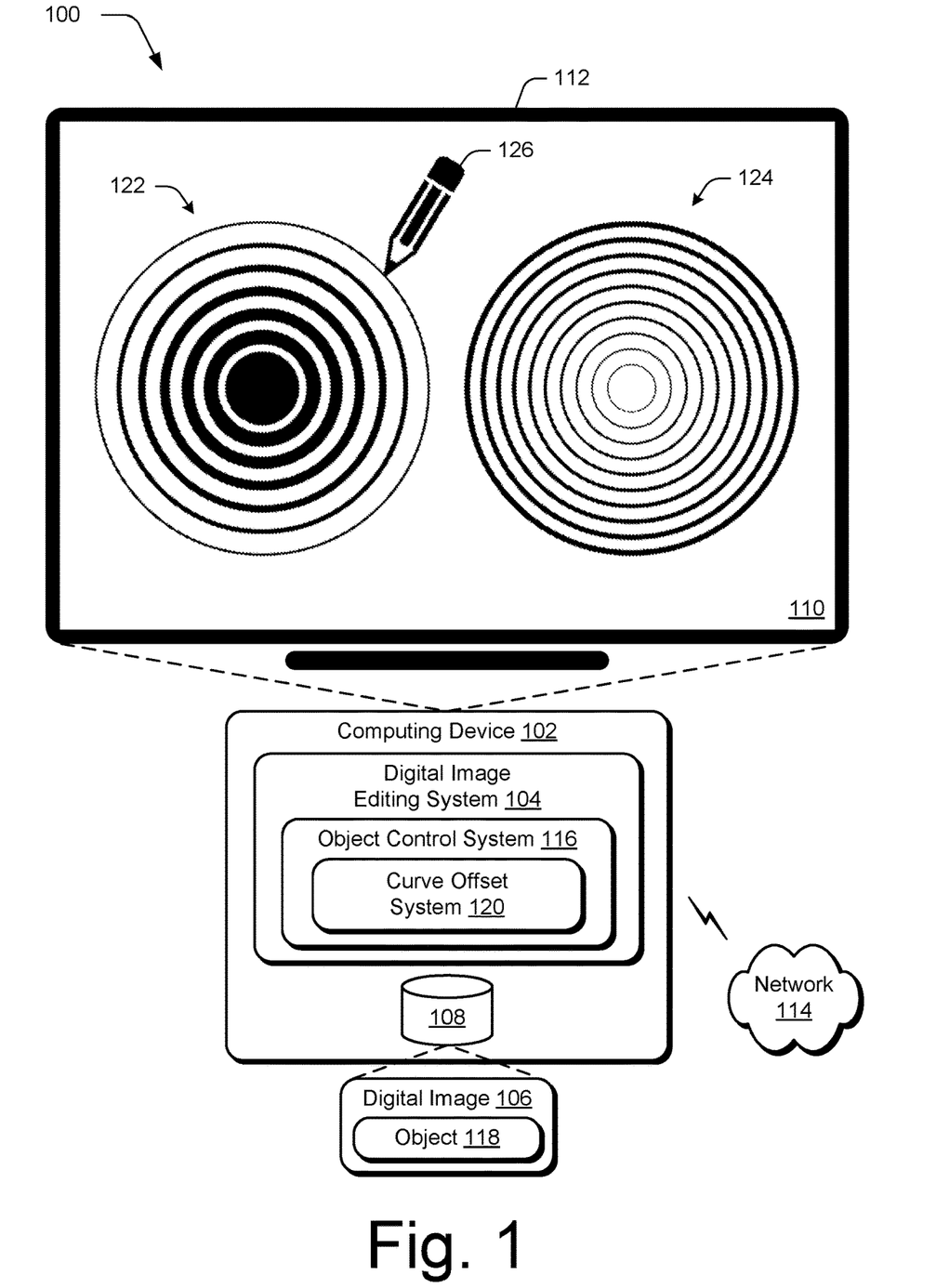
FIG. 1 depicts an example of curve offset operations as implemented in a digital image editing environment.

FIG. 1 is an illustration of a digital medium environment 100 in an example implementation that is operable to employ curve offset operation techniques as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 8.

The computing device 102 is illustrated as including a digital image editing system 104. The digital image editing system 104 is implemented at least partially in hardware of the computing device 102 to process and transform a digital image 106, which is illustrated as maintained in a storage device 108 (e.g., a computer-readable storage medium) of the computing device 102. Such processing includes creation of the digital image 106, modification of the digital image 106, and rendering of the digital image 106 in a user interface 110 for output, e.g., by a display device 112. Digital images 106 include any form of visual presentation that is capable of being rendered for display in the user interface 110, e.g., raster images, vector objects, and so forth. Although illustrated as implemented locally at the computing device 102, functionality of the digital image editing system 104 is also configurable in whole or in part via functionality available via the network 114, such as part of a web service or "in the cloud."

An example of functionality incorporated by the digital image editing system 104 to process the image 106 is illustrated as an object control system 116. The object control system 116 is configured to control operations involving location and arrangement of objects 118 within the digital image 106. Objects 118 are also configurable in a variety of ways, examples of which include vector objects, raster objects, or any other object that is capable of being rendered as part of the digital image 106 in the user interface 110 by the display device 112.

The object control system 116 includes a curve offset system 120. The curve offset system 120 is configured to control operations usable to generate segments (e.g., as part of a path) based on an offset value with respect to a curve. The offset value defines a distance to be used by the curve offset system 120 to space the segment from the curve.

In the illustrated user interface 110, for instance, a plurality of objects are formed as concentric circles 122, 124 using paths in the user interface 110. Each of these paths are formed using segments based on an offset value of a curve that is proximal to a user input 126. The curve offset system 120 in the illustrated example is used to generate a circle based on a curvature of another circle. This is usable in the illustrated example to efficiently leverage existing curves in the user interface 110 to form complementary segments. The user input 126, for instance, is usable to draw successive circles within an existing circle, draw successive circles outward as encompassing the successive circles, and so forth. In this way, the curve offset operations have increased accuracy and improve computing device operation. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Curve Offset Operations

The following discussion describes curve offset operation techniques that are implementable utilizing the previously described systems and devices. Aspects of each of the procedures are implemented in hardware, firmware, software, or a combination thereof. The procedure is shown as a set of blocks that specify operations performed by one or more devices and are not necessarily limited to the orders shown for performing the operations by the respective blocks.

Figure 2:
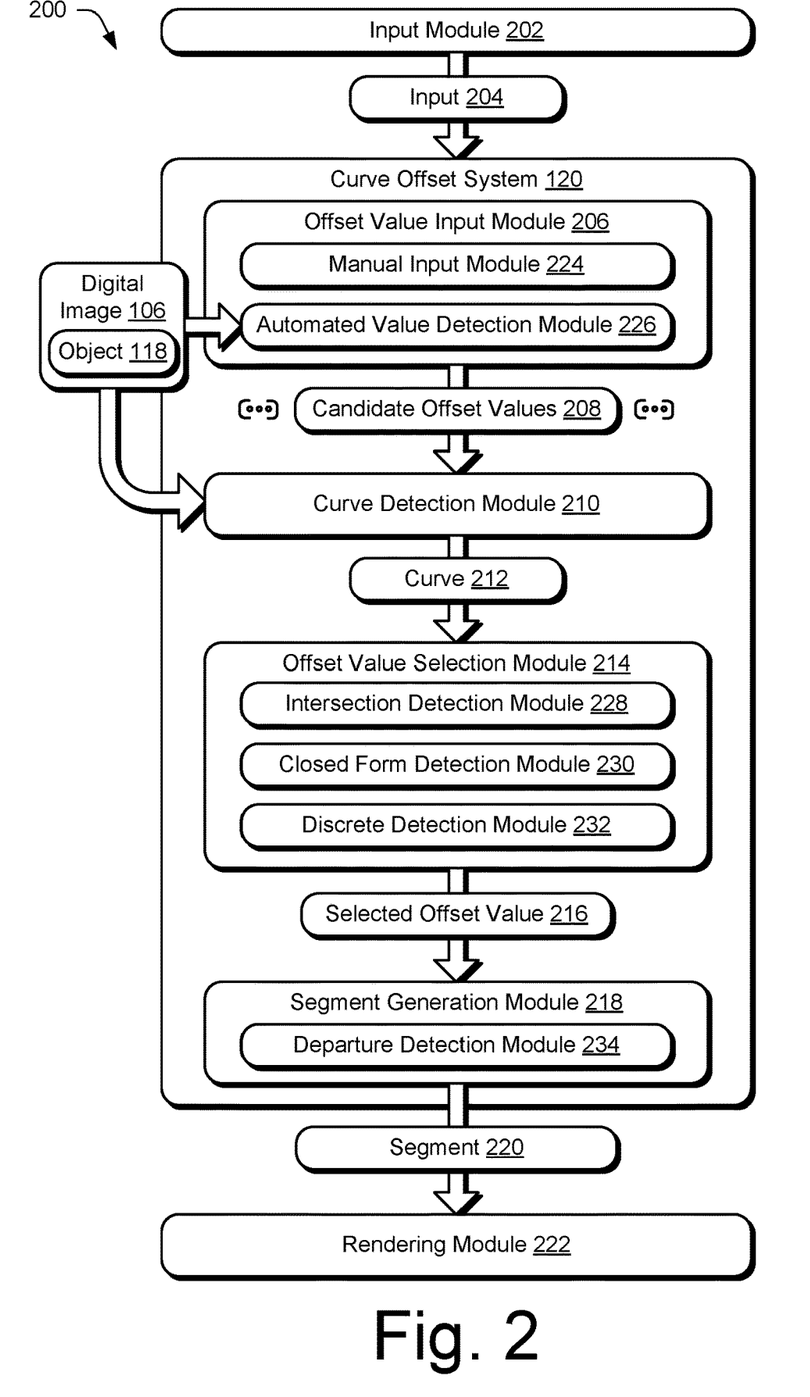
FIG. 2 depicts a system in an example implementation showing operation of a curve offset alignment system of FIG. 1 in greater detail.

FIG. 2 depicts a system 200 in an example implementation showing operation of a curve offset system 120 of FIG. 1 in greater detail. To begin in this example, an input module 202 receives an input 204. The input 204 is configurable in a variety of ways. The input 204, for instance, is receivable as a freeform line drawn in the user interface 110, e.g., using a stylus, cursor control device, gesture, and so forth. The freeform line in this example is defined as a series of input points specifying locations with respect to the digital image 106 and/or the user interface 110. The input points define a series of segments that collectively further define a path. In another instance, the input 204 is defined directly as successive input points, e.g., as two or more "taps" of a gesture, "click" of a cursor control device, and so forth that specify respective locations within the digital image 106. A variety of other examples are also contemplated, as selection of a representation (e.g., icon) usable to initiate a curve offset operation, e.g., via a menu in the user interface 110.

The input 204 is then received by the curve offset system 120. The curve offset system 120 is configured to generate a segment (e.g., alone or as part of path) as offset from a curve in the digital image 106. In this way, the segment is formed to follow the curve, automatically and without user intervention. This is usable, for instance, to reposition input points from the input 204 (e.g., the freeform example above) to follow the curve. In another example, this is usable to generate the segment as a trajectory between input points, e.g., between a beginning input point and an end input point. Further, the curve offset system 120 is configurable to support deviations from following the curve, an example of which is described in relation to FIG. 4.

To do so in the illustrated system 200, the curve offset system 120 employs an offset value input module 206 to obtain candidate offset values 208. A curve detection module 210 is used to detect a curve that is to be used as a basis for the operation. An offset value selection module 214 is configured to select an offset value from the candidate offset values 208, e.g., as a selected offset value 216. The selected offset value 216 and the curve 212 are then used as a basis by a segment generation module 218 to generate a segment based on the input 204 for rendering by the rendering module 222, e.g., for display in a user interface 110 by a display device 112.

The offset value input module 206, for instance, is configurable to generate the candidate offset values 208 in a variety of ways. In a first example, a manual input module 224 is configured to receive user inputs that specify the candidate offset values 208, e.g., entered via respective amounts of "points" similar to font size and spacing via the user interface 110. In a second example, an automated value detection module 226 is configured to detect the candidate offset values 208, automatically and without user intervention, based at least in part on respective distances between a plurality of objects 118 in the user interface.

Figure 3:
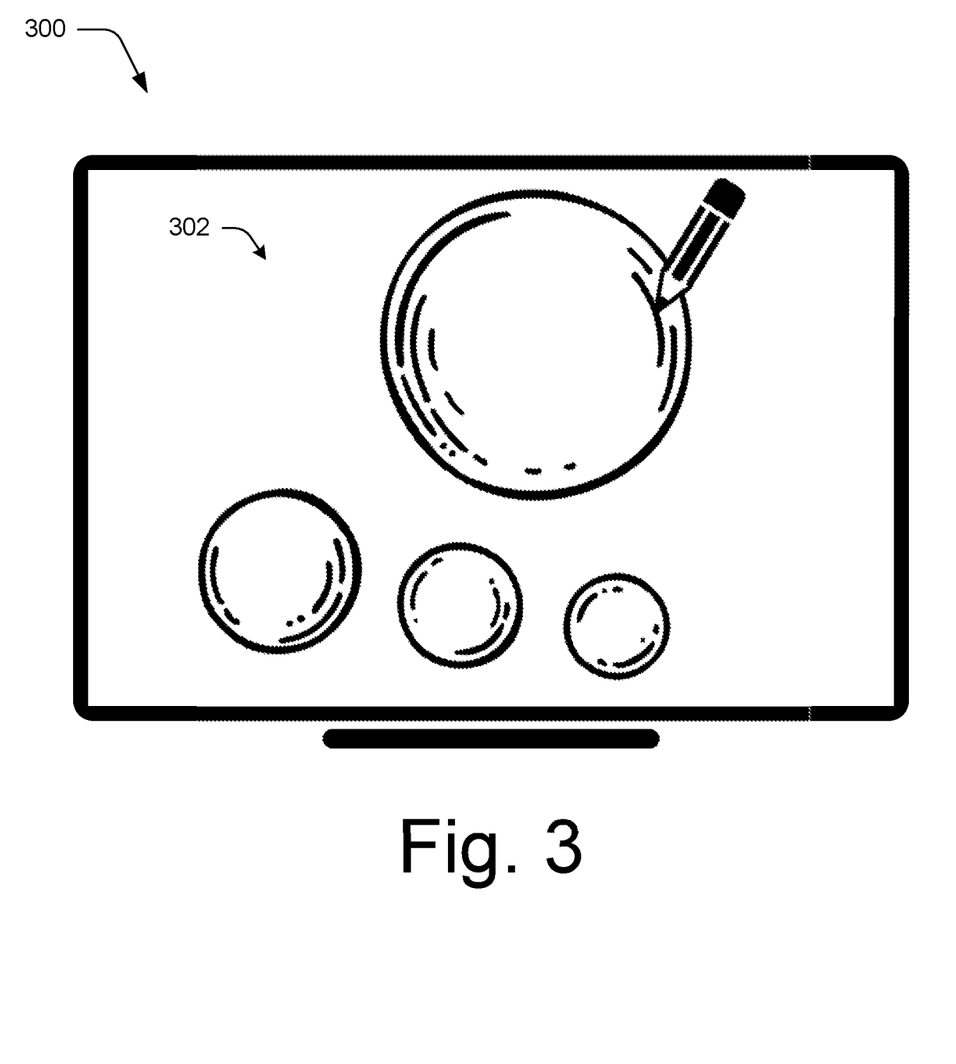
FIG. 3 depicts an example implementation of objects and automated offset value detection.

FIG. 3 depicts an example implementation 300 of automated detection of the candidate offset values 208 by the automated value detection module 226. The objects 118 in this example represent bubbles 302. The objects 118 are formed using segments, and segments forming paths, to specify an outline as a circle forming the bubble 302 and segments representative of reflections to represent curvature of the bubbles 302. As such, the objects 118 form a variety of curves. Further, these curves include respective amounts of distance between each other. These distances are usable by the automated value detection module 226 to generate the candidate offset values 208.

This is usable in a variety of ways, such as to use these amounts directly as the candidate offset values 208, through a weighting based on a number of occurrences (e.g., for ordering, to include those over a threshold amount), and so forth. Further, the candidate offset values 208 are usable to define different offset amounts based on location, e.g., to follow an outside curvature at distances that are greater than those used within the shape to draw the reflections in the illustrated example.

The curve detection module 210 is representative of functionality to select a curve 212 (or multiple curves) that are candidates for use as part of the curve offset operations. In this example, the curve 212 is also referred to as "C" along with an offset value denoted using "$\delta$" Consider a scenario in which "p" is an input point (e.g., a current mouse position, touchpoint, etc.) in a user interface 110 and there are "n" different candidate offset values 208. A first example is described below for a single offset value "$\delta$" which is then followed by a discussion involving a plurality of candidate offset values 208.

The curve detection module 210 begins by detecting curves in the digital image 106 (e.g., objects 118) with are within a threshold proximity (e.g., "$\delta$+e") of an input point "p," where "e" is a snapping tolerance. A shape is defined by the curve detection module 210 having a plurality of line segments with a center of the shape defined at the input point "p." The plurality of line segments, for instance, form a rectangle "$R_p$" with a center at "p" and a width of "2*e." The curve detection module 210 identifies intersection of curves of the digital image 106 in order to detect which curves are candidates for use as part of a curve offset operation.

After selection of the curve 212, e.g., as a single curve or a plurality of candidate curves, an offset value selection module 214 is employed to select an offset value (e.g., as a selected offset value) 216. The offset value selection module 214 is also usable to select the curve from a plurality of candidate curves. Functionality to do so is represented as an intersection detection module 228, a closed form detection module 230, and a discrete detection module 232.

The intersection detection module 228 is configured such that, for each curve "C" (which is also represented as "B(t)"), a "$t_{min}$" and "$t_{max}$" parametric value is calculated which intersect a tolerance rectangle "$R_p$," e.g., with width "2e." This is usable to create an offset curve "$C_0$" from "$t_{min}$" and "$t_{max}$." Processing complexity of this approach is based on a number of candidate offset values 208 and a number of sample points inside each curve 212.

The closed form detection module 230 is configured to detect candidate offset values 208 for each curve 212, e.g., using the following equation:

$$(B(t)-p) \cdot B'(t)=0$$

which is used to determine parametric coordinate in "B(t)" where a normal "n(t)" passes through "p." This equation is configured for quadratic Bezier curves and is solvable in "O(1)" times, and is quintic for cubic Bezier curves.

The discrete detection module 232 employs a closed form technique. In this approach, a parameter "t" space is sampled from "$t_{min}$" and "$t_{max}$." A normal is then found from each of those sample points "$n_t$." A minimum distance "$d_{min}$" is calculated of "p" from "$n_t$," which is a length of a perpendicular line from "$n_t$" passing through "t." For a line that passes through "$p_{nt}$," if "$d_{min}$" is less than a snapping tolerance "e," then possible offset value "$\delta_t$" is "$\|p_t - p_{nt}\|$." The selected offset value 216 is then found that is within "e" range of "$\delta_t$." Hence, complexity of this technique is independent of a number of the candidate offset values 208.

The selected offset value 216 and the curve 212 are then used by the segment generation module 218 to generate the segment 220 based on the input 204 using a curve offset operation. The curve offset operation is utilized to generate the segment 220 in a variety of ways. In a first example, this is used to realign input points of the input 204 based on the offset value from the curve 212.

In a second example, this is performed by completing a trajectory between the input points, e.g., between the beginning input point and the end input point. The segment is configured to follow the curve at the offset value. As a result, the segment is configurable to follow simple and complex curves automatically and without user intervention.

These techniques also support flexible operation, functionality of which is represented by a departure detection module 234. In a third example, the input points include a beginning input point disposed within the threshold trajectory and an end input point. The curve detection module 210 and offset value selection module 214 determine that these points are within threshold trajectory. If so, the segment is generated by completing a trajectory between these points at an offset value as spaced from the curve. In situations in which the input points are not disposed within the threshold trajectory, a segment is formed "as is" as a departure from curve alignment performed by the curve alignment operation and as such is not based on alignment to a curve based on an offset value.

Figure 4:
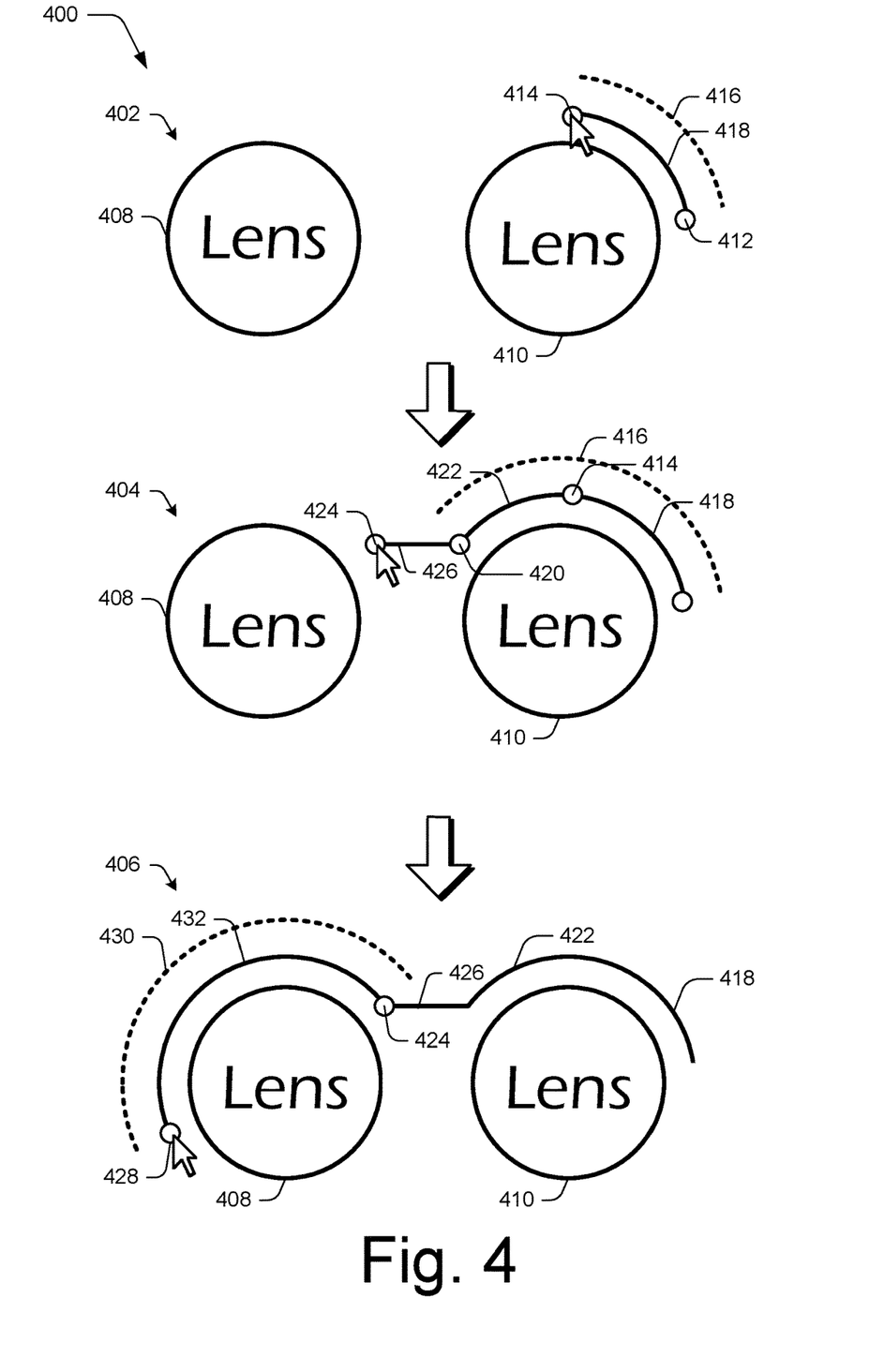
FIG. 4 depicts an example implementation of use of a curve offset operation as realigning an input, the operation including a deviation.

FIG. 4 depicts an example implementation 400 of use of a curve offset operation as realigning an input and use of a deviation. Departure of alignment based on the curve is configurable as a mode implemented by the curve offset system 120 that operates on sets of input points "per segment" along a path. FIG. 4 is illustrated using a first stage 402, a second stage 404, and a third stage 406 and includes a first object 408 and a second object 410. The first and second objects 408, 410 are depicted as lenses and a path is generated as a series of segments for form a eyeglass frame for the lens that has a complementary shape.

At the first stage 402, a first input point 412 and a second input point 414 are detected. These input points are recognized by the curve offset system 120 as a beginning input point and an end input point to be used for generating a segment, e.g., by first and send "taps" or "clicks" received via the user interface 110. In response, the curve offset system 120 determines whether these input points satisfy a condition for use as part of the curve offset operation and therefore are to be aligned to a curve or do not satisfy the condition and are to be used to generate a segment independent of the curve.

To do so, as determination is made as to whether both the beginning and end input points are within a threshold trajectory defined in relation to a curve, e.g., of the second object 410. If so, a trajectory is completed between these input points, e.g., as a first segment 418. The threshold trajectory 416, for instance, is definable based on the offset value, e.g., double the offset value, the offset value and a snapping tolerance, and so forth. In this example, the first and second input points 414 satisfy the condition and thus the first segment 418 is generated.

At the second stage 404, this process continues through input of a third point 420. The curve offset system 120 now recognizes the second input point 414 as the beginning input point and the third input point 420 as the end input point. Like the previous example, these input points are within the threshold trajectory 416, and therefore a trajectory is again completed to form a second segment 422, which is added to a path that includes the first segment 418.

A fourth input point 424 is then received. The curve offset system 120 then recognizes the third input point 420 as the beginning input point and the fourth input point 424 as the end input point. In this instance, however, these input points are do not satisfy the condition for use as part of a curve offset operation because the fourth input point 424 is disposed beyond (i.e., "outside") the threshold trajectory 416. Accordingly, the curve offset system 120 forms a third segment 426 independent of a curvature of the second object 410, which is added to the path including the first segment 418 and the second segment 422.

At the third stage 406, a fifth input point 428 is received. The curve offset system 120 recognizes the fourth input point 424 as the beginning input point and the fifth input point 428 as the end input point. A determination is made as to whether both the beginning and end input points are within a threshold trajectory 430 defined in relation to a curve, e.g., of the first object 408 in this example.

These input points satisfy the condition for use as part of a curve offset operation, and therefore a fourth segment 432 is generated as a trajectory between these points that follows an offset value specified for the first object 408, which may be the same as or different from an offset value utilized for the second object 410. The fourth segment 432 is also added to the path that includes the first segment 418, the second segment 422, and the third segment 426. In this way, the curve offset system 120 supports flexible use of the curve offset operations for respective segments included in a single path.

Figure 5:
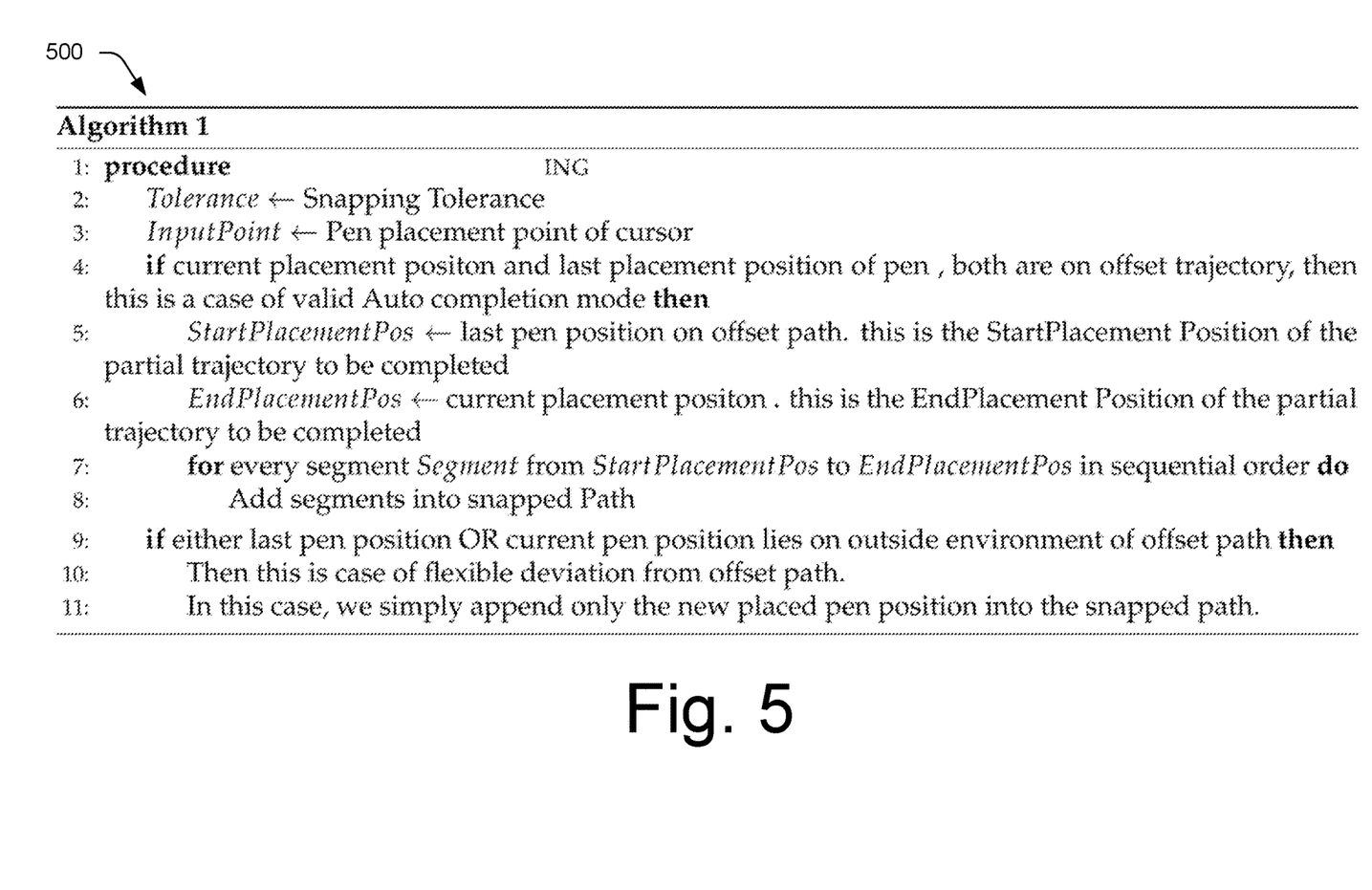
FIG. 5 depicts an example procedure supporting curve offset operations and deviation from the operations.

FIG. 5 depicts an example procedure 500 supporting curve offset operations and deviation from the operations. In this example, the "tolerance" is a snapping tolerance (e.g., "e" above) and an input point is defined as a pen placement point of a cursor, e.g., from a cursor control device. If a current placement position (e.g., end input point) and a last placement position of pen (e.g., beginning input point), both within an offset trajectory (e.g., threshold trajectory), then, the curve offset operation is satisfied as implementing an auto completion mode. This procedure 500 continues as described in relation to FIG. 4 for adding segments to form a path.

Figure 6:
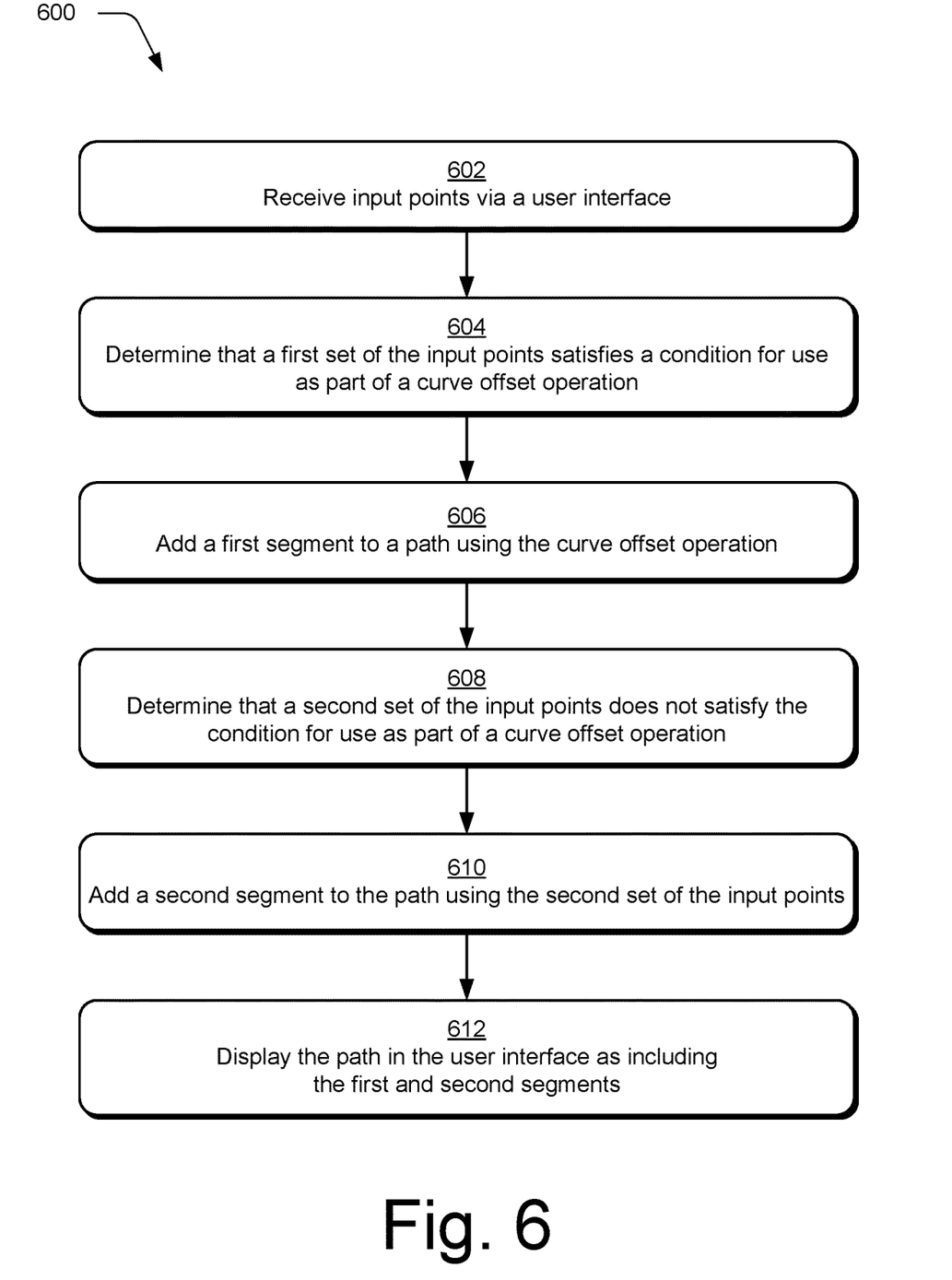
FIG. 6 depicts an example procedure supporting curve offset operations.

FIG. 6 depicts an example procedure 600 supporting curve offset operations. Input points are received via a user interface (block 602). A determination is made that a first set of the input points satisfies a condition for use as part of a curve offset operation (block 604). Because the points satisfy the condition, a first segment is added to a path using a curve offset operation (block 606), e.g., utilizes a curve offset mode.

A determination is then made that a second set of the input points do not satisfy the condition for use as part of a curve offset operation (block 608). A second segment is generated and added to the path using the second set of input points (block 610), e.g., independent of the curve offset operation and does not use the curve offset mode. The path in the user interface is displayed as including the first and second segments (block 612).

Figure 7:
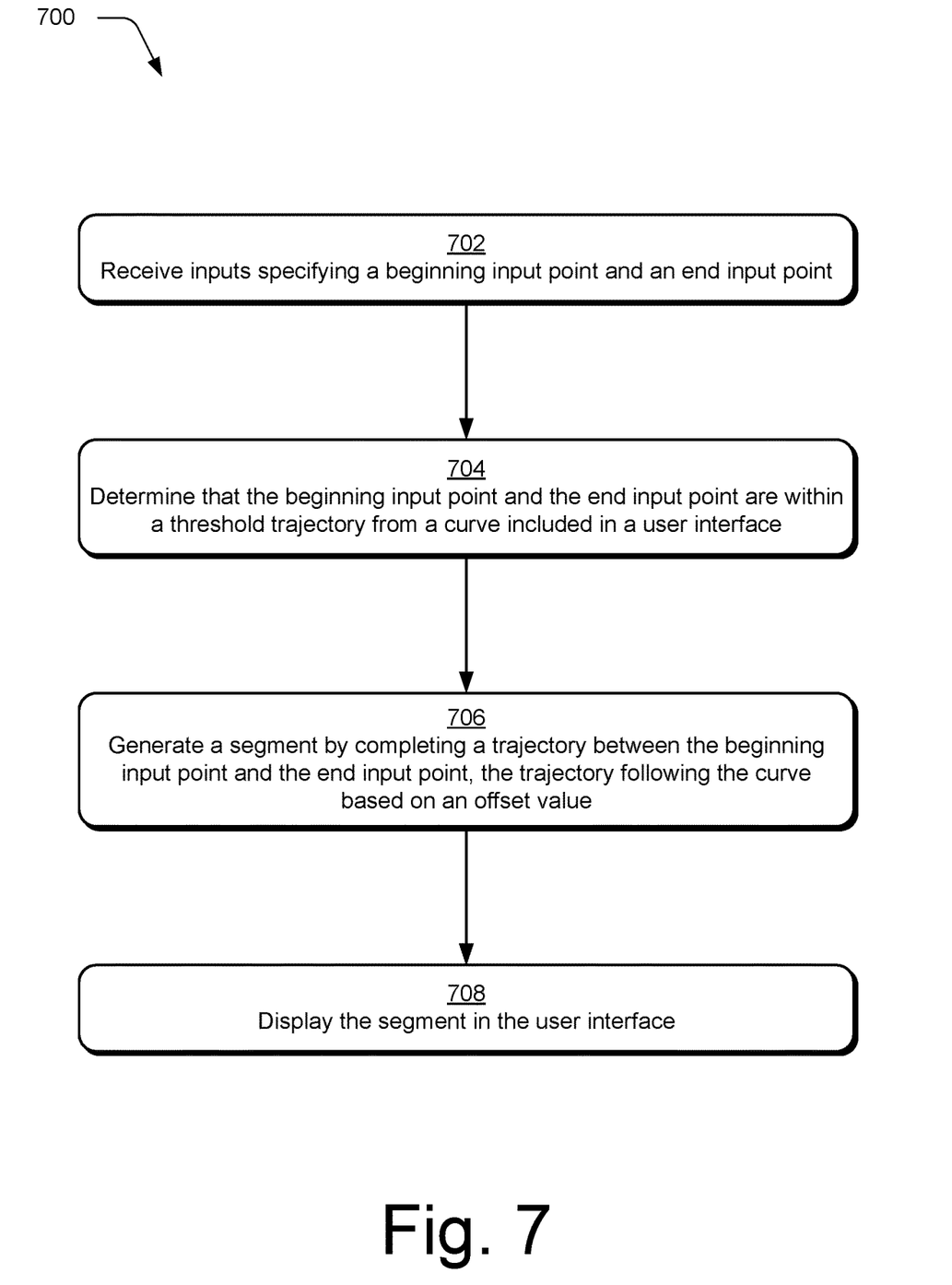
FIG. 7 depicts an example procedure supporting flexible implementation of curve offset operations.

FIG. 7 depicts an example procedure 700 supporting flexible implementation of curve offset operations. In this example, inputs are received specifying a beginning input point and an end input point (block 702). A determination is made that the beginning input point and the end input point are within a threshold trajectory from a curve included in a user interface (block 704). A segment is generated by completing a trajectory between the beginning input point and the end input point. The trajectory follows the curve based on an offset value (block 706). The segment is then displayed in the user interface (block 708). A variety of other examples are also contemplated.

Example System and Device

Figure 8:
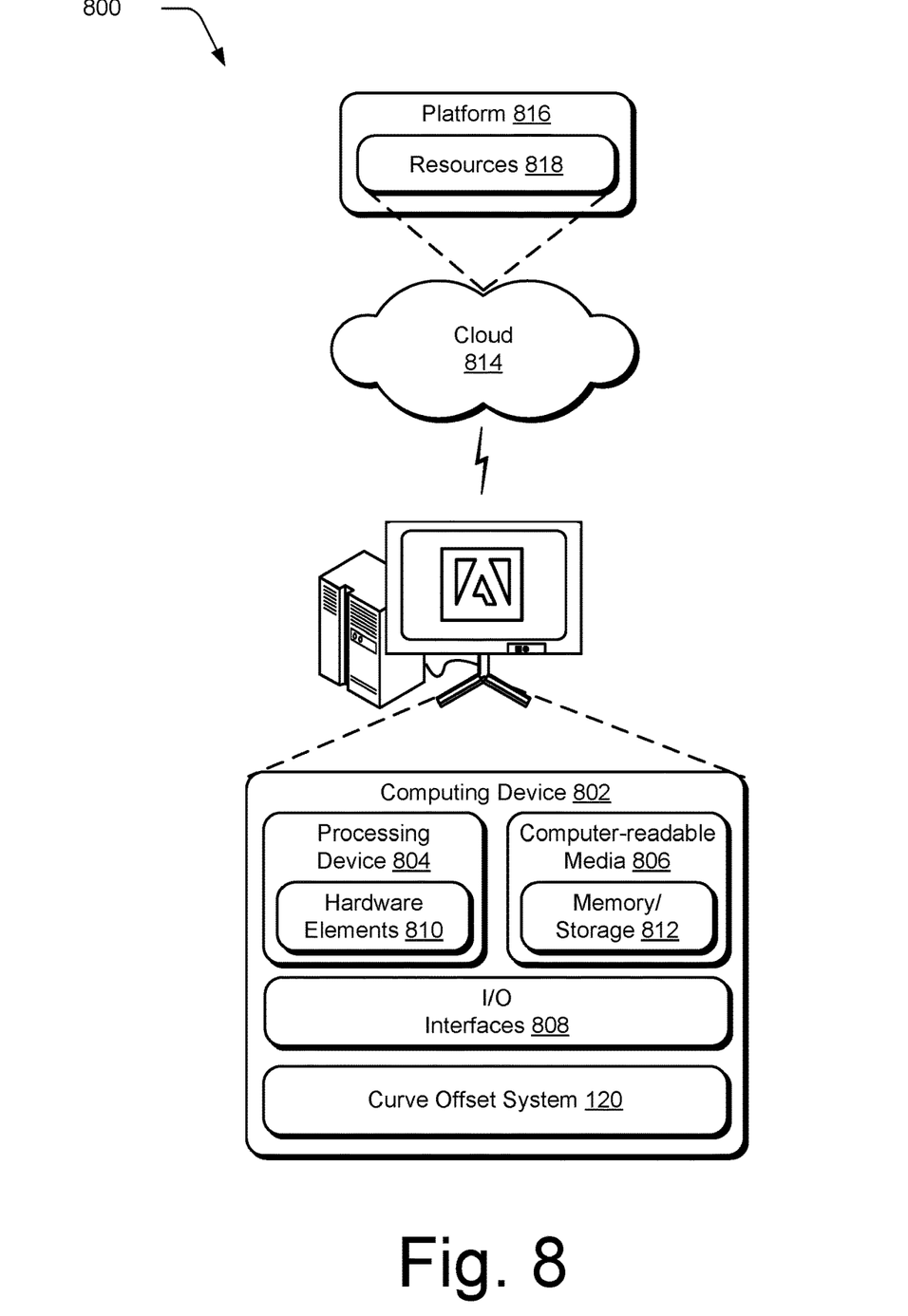
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the curve offset alignment system 120. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) that causes the processing device to perform operations in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

In implementations, the platform 816 employs a "machine-learning model," which refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    determining, by a processing device, that a set of input points received via a user interface drawn as a freeform line satisfy a condition for use as part of a curve offset operation;
    selecting, by the processing device, an offset value from a plurality of candidate offset values detected, automatically and without user intervention, based at least in part on respective distances between a plurality of objects in the user interface;
    selecting, by the processing device, a curve from a plurality of curves included in the user interface;
    generating, by the processing device, a segment as a trajectory defined by the set of input points as offset from the selected curve based on the selected offset value; and
    displaying, by the processing device, the segment in the user interface.

2. The method as described in claim 1, wherein the determining that the first set of input points satisfy the condition includes determining that the first set of input points are within a threshold trajectory from the curve.

3. The method as described in claim 1, wherein:
    the set of input points includes a beginning input point and an end input point;
    the determining that the set of input points satisfy the condition is based on determining that the beginning input point and the end input point are within a threshold trajectory from the curve; and
    the segment is generated by completing a trajectory between the beginning input point and the end input point of the set of input points based on the offset value and the curve.

4. The method as described in claim 1, wherein the offset value is set based on a user input received via the user interface.

5. The method as described in claim 1, wherein the offset value is set at zero as replicating the curve.

6. The method as described in claim 1, wherein the determining that the set of input points satisfy the condition for use as part of the curve offset operation with respect to the curve includes selecting the curve from a plurality of candidate curves.

7. The method as described in claim 6, wherein the selecting includes detecting the plurality of candidate curves as being disposed within a threshold proximity of at least one input point of the set of input points.

8. The method as described in claim 7, wherein the detecting includes identifying an intersection of the plurality of candidate curves with a line segment of a plurality of line segments of a shape defined as having a center based on the at least one input point.

9. The method as described in claim 1, further comprising:
    responsive to determining that a different set of input points that are drawn as the freeform line do not satisfy the condition for use as part of the curve offset operation that is determined to be satisfied by the set of input points,
    adding, by the processing device, a second segment to the segment, the second segment generated independent of the curve using the different set of points; and
    displaying, by the processing device, in the user interface the segment and the second segment.

10. The method as described in claim 9, wherein the determining that the different set of input points does not satisfy the condition includes determining that at least one of the different set of input points are not within a threshold trajectory from the curve.

11. The method as described in claim 9, wherein:
    the determining that the set of input points satisfy the condition includes determining that the set of input points are within a threshold trajectory from the curve; and
    the determining that the different set of input points does not satisfy the condition includes determining that at least one of the different set of input points are not within the threshold trajectory from the curve.

12. A system comprising:
a processing device; and
a computer-readable storage media storing instruction that, responsive to execution by the processing device, causes the processing device to perform operations including:
receiving inputs specifying a beginning input point and an end input point via a user interface;
determining that the beginning input point and the end input point are within a threshold trajectory from a curve included in the user interface;
generating a segment by completing a trajectory between the beginning input point and the end input point, the trajectory following the curve based on an offset value, the offset value selected from a plurality of candidate offset values, automatically and without user intervention, based at least in part on respective distances between a plurality of objects in the user interface; and
displaying the segment in the user interface.

13. The system as described in claim 12, wherein the offset value is set based on a user input received via the user interface.

14. The system as described in claim 12, further comprising selecting the curve from a plurality of candidate curves in the user interface.

15. The system as described in claim 14, wherein the selecting is based on intersection of at least one line segment of a shape formed based on the beginning input point or the end input point.

16. The system as described in claim 12, wherein the inputs are drawn as a freeform line in the user interface.

17. The system as described in claim 12, wherein the offset value is selected from a plurality of candidate offset values.

18. One-or-more computer-readable storage media that are non-transitory and storing instructions that, responsive to execution by a processing device, causes the processing device to perform operations including:
determining that a set of input points received via a user interface drawn as a freeform line satisfy a condition for use as part of a curve offset operation;
selecting an offset value from a plurality of candidate offset values detected, automatically and without user intervention, based at least in part on respective distances between a plurality of objects in the user interface;
selecting a curve from a plurality of curves included in the user interface;
generating a segment as a trajectory defined by the set of input points as offset from the selected curve based on the selected offset value; and
displaying the segment in the user interface.

19. The one-or-more computer-readable storage media as described in claim 18, wherein the determining that the set of input points satisfy the condition is based on determining that a beginning input point and an end input point of the set of input points is included within a threshold trajectory.

20. The one-or-more computer-readable storage media as described in claim 18, wherein the selecting the curve is based on an intersection of at least one line segment of a shape formed using at least one input point of the set of input points.

* * * * *